United States Patent [19]
Van Bemmel et al.

[11] Patent Number: 5,995,907
[45] Date of Patent: Nov. 30, 1999

[54] SEISMIC SIGNAL PROCESSING METHOD AND APPARATUS FOR GENERATING TIME SLICE OR HORIZON MAPS IN RESPONSE TO SEISMIC TRACES AND QUADRATURE TRACES TO DETERMINE GEOLOGIC FEATURES

[75] Inventors: Peter P. Van Bemmel, Houston; Randolph E. F. Pepper, Sugar Land, both of Tex.

[73] Assignee: GeoQuest, Houston, Tex.

[21] Appl. No.: 09/019,180

[22] Filed: Feb. 5, 1998

[51] Int. Cl.$^6$ ..................................................... G06F 19/00
[52] U.S. Cl. ................................................................ 702/16
[58] Field of Search .................................. 702/14, 16, 17, 702/18; 367/72, 73

[56] References Cited

U.S. PATENT DOCUMENTS

| | | |
|---|---|---|
| 4,164,036 | 8/1979 | Wax . |
| 4,945,519 | 7/1990 | Stanley et al. ............................ 702/16 |
| 5,383,114 | 1/1995 | Chambers ................................. 702/16 |
| 5,440,525 | 8/1995 | Dey-Sarkar et al. ..................... 702/14 |
| 5,537,320 | 7/1996 | Simpson et al. . |
| 5,537,365 | 7/1996 | Sitoh . |
| 5,563,949 | 10/1996 | Bahorich et al. . |

FOREIGN PATENT DOCUMENTS 1 534 657  12/1978  United Kingdom .

OTHER PUBLICATIONS

"Poststack Estimation of Three–Dimensional Crossline Statics" by Phillip S. Schultz, and August Lau Geophysics, vol. 49, No. 3 (Mar. 1984), pp. 227–236.

Patent Abstracts of Japan, Publication Number 06165210, publication date Jun. 10, 1994, Application date Nov. 24, 1992, Application number 04313497.

"Complex seismic trace analysis", by M.T. Taner, F. Koehler, and R.E. Sheriff, presented at the 46th Annual International SEG Meeting, Oct. 27, 1976.

Primary Examiner—Donald E. McElheny, Jr.
Attorney, Agent, or Firm—John H. Bouchard

[57] ABSTRACT

A method and associated apparatus for generating time slice maps and/or horizon maps, representative of a time slice or a horizon in an earth formation that is subject to a seismic operation, in response to received seismic data includes the steps of: (a) cross correlating a plurality of seismic traces from the seismic data and a corresponding plurality of quadrature traces associated, respectively, with the plurality of seismic traces to obtain a corresponding plurality of cross correlation functions "$Q(\tau)$", (b) obtaining a plurality of particular values from the plurality of cross correlation functions "$Q(\tau)$", at least one particular value being obtained from each cross correlation function, and (c) assigning the plurality of particular values to a respective plurality of reflection points on a map, each particular value being assigned to a different one of the reflection points, thereby constructing the time slice map and/or the horizon map. The particular value could be either a quadrature correlation coefficient (QCC), or a time lag (TL), or a sum of a normalized quadrature correlation coefficient and a normalized time lag ($QCC_n+TL_n$).

10 Claims, 13 Drawing Sheets

 
FIG. 4
(PRIOR ART)
FIG. 5
(PRIOR ART)

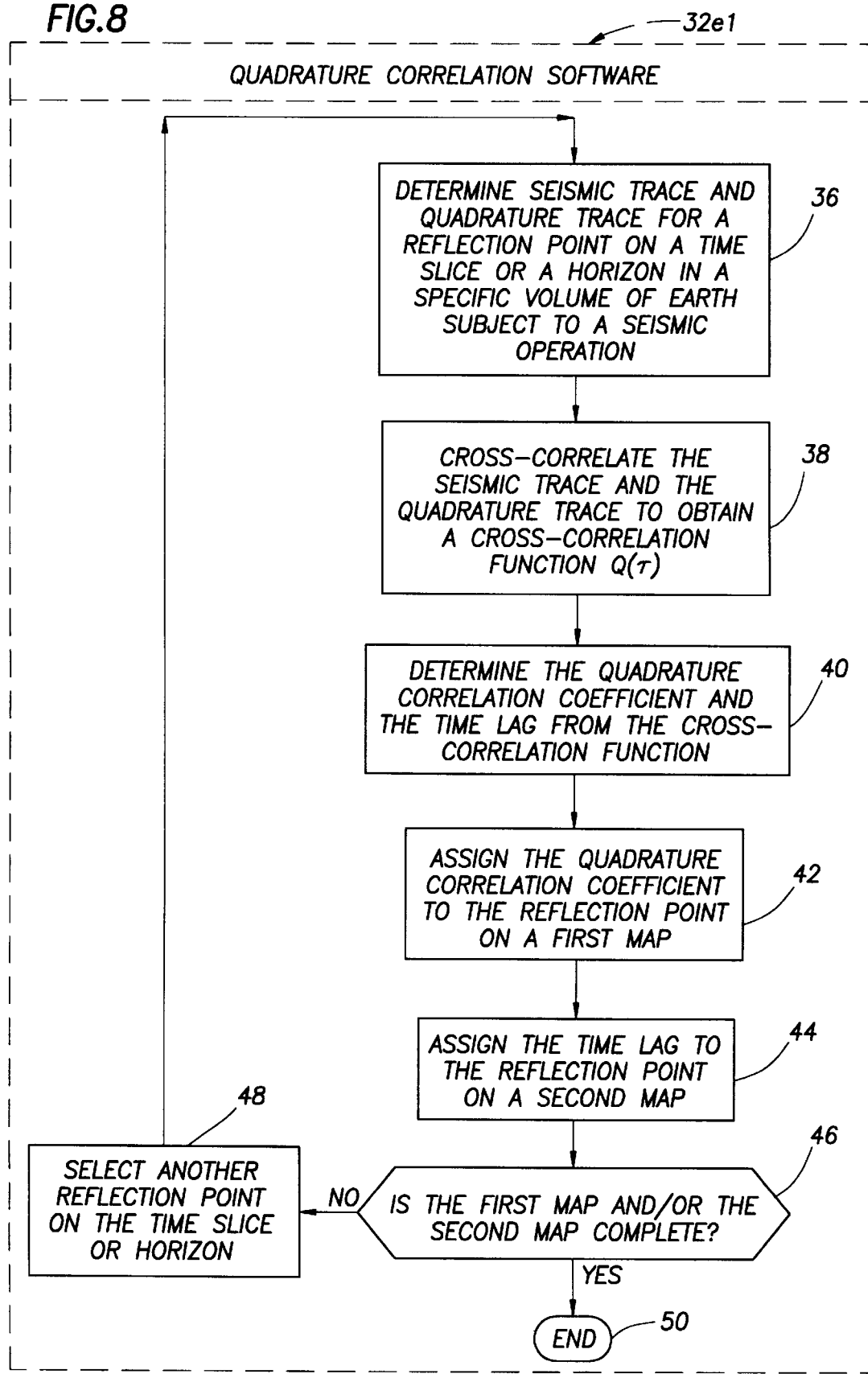

$R(t) = [g(t)^2 + h(t)^2]^{1/2}$ — REFLECTION STRENGTH $\theta(t) = \tan^{-1}\left[\dfrac{h(t)}{g(t)}\right]$ — INSTANTANEOUS PHASE CROSS-CORRELATE g(t) AND h(t)
TO OBTAIN CROSS-CORRELATION FUNCTION Q(τ)

$$Q(\tau) = \frac{\sum_{t=-N}^{N} g(t)\, h(t+\tau)}{\left[\sum_{t=-N}^{N} g(t)^2 \sum_{t=-N}^{N} h(t)^2\right]^{1/2}}$$

66

SEISMIC SIGNAL PROCESSING METHOD AND APPARATUS FOR GENERATING TIME SLICE OR HORIZON MAPS IN RESPONSE TO SEISMIC TRACES AND QUADRATURE TRACES TO DETERMINE GEOLOGIC FEATURES

BACKGROUND OF THE INVENTION

The subject matter of the present invention relates to a seismic signal processing method and apparatus which responds to a plurality of seismic signals emerging from an earth formation by generating either time slice attribute maps or horizon attribute maps which are used to determine the geologic features on the time slices or the horizons in the earth formation, a first said map including a plurality of quadrature correlation coefficient values, a second said map including a plurality of time lag values, and a third said map including a plurality of combined quadrature correlation coefficient/time lag values.

Two dimensional seismic data is acquired along lines that consist of geophone arrays onshore or hydrophone streamers offshore. The geophones or hydrophones act as sensors which receive seismic energy that is transmitted into an earth formation and is reflected back to the surface of the earth from the subsurface horizon interfaces in the earth formation. In three dimensional (3-D) seismic, the principle is the same except that the arrays of geophones and hydrophones are more closely spaced to provide more detailed subsurface coverage. As a result, extremely large volumes of digital data are received which needs to be recorded, stored, and processed before final interpretation can be made. The processing of the digital data requires computer resources which store and execute complex software for enhancing the digital data/seismic signals received and for muting any accompanying noise which masks the signals. Once the digital data/seismic signals are processed, the resultant processed signals are recorded and displayed in the form of horizontal time slice maps or horizon maps which display various geologic features situated on the time slice map or the horizon map in the earth formation. As a result, three dimensional seismic is used extensively to provide a more detailed structural and stratigraphic image of subsurface reservoirs. However, as good as the 3-D seismic surveys and interpreters have become, improvements are needed.

One such improvement is disclosed in U.S. Pat. No. 5,563,949 to Bahorich et al, the disclosure of which is incorporated by reference into this specification. The Bahorich patent discloses one such software based method and apparatus which, when executed by a processor of a computer, generates time slice maps that display various geologic features in the earth formation that was subjected to the seismic survey operation. However, the method and apparatus disclosed in the Bahorich patent represents one method for generating the time slice maps. Other such methods and associated apparatus can be employed for generating those time slice maps.

SUMMARY OF THE INVENTION

Accordingly, it is a primary object of the present invention to disclose another such method and associated apparatus for generating time slice maps and/or horizon maps in response to received seismic data, the maps displaying various geologic features of an earth formation.

It is a primary aspect of the present invention to cross correlate a seismic trace g(t) from received seismic data and a quadrature trace h(t) corresponding to that seismic trace g(t) to obtain a cross correlation function "$Q(\tau)$" and to generate time slice maps and/or horizon maps from a plurality of the cross correlation functions "$Q(\tau)$".

It is a further aspect of the present invention to disclose and claim another such method and associated apparatus for generating time slice maps and/or horizon maps in response to received seismic data, that method including the steps of: cross correlating a plurality of seismic traces from the seismic data and a corresponding plurality of quadrature traces associated with the seismic trace to obtain a corresponding plurality of cross correlation functions "$Q(\tau)$", obtaining a plurality of particular values from the plurality of cross correlation functions "$Q(\tau)$", and assigning a plurality of the particular values to a plurality of reflection points on a map thereby constructing a time slice map and/or a horizon map.

It is a further aspect of the present invention to disclose and claim another such method and associated apparatus for generating time slice maps and/or horizon maps in response to received seismic data, that method including the steps of: determining a seismic trace and a quadrature trace corresponding to the seismic trace associated with a reflection point on a time slice or a horizon in an earth formation, cross correlating the seismic trace and the quadrature trace for that reflection point to obtain a cross correlation function "$Q(\tau)$" for that reflection point, determining a quadrature correlation coefficient (QCC) and a time lag (TL) from the cross correlation function for that reflection point, assigning the quadrature correlation coefficient (QCC) to that reflection point on a first map, assigning the time lag (TL) to that reflection point on a second map, and repeating the above steps for all other reflection points on the time slice or the horizon until all the other quadrature correlation coefficients (QCC) for all the other reflection points on the first map have been determined and assigned to all the other reflection points on the first map and all the other time lags (TL) for all the other reflection points on the second map have been determined and assigned to all the other reflection points on the second map, the first map representing one such time slice map and/or horizon map generated by the method and apparatus of the present invention, the second map representing another such time slice map and/or horizon map generated by the method and apparatus of the present invention.

It is another aspect of the present invention to disclose and claim another such method and associated apparatus for generating time slice maps and/or horizon maps in response to received seismic data, that method further including the step of combining a plurality of normalized quadrature correlation coefficients "$QCC_n$" associated with the reflection points on the first map with a plurality of normalized time lags "$TL_n$" associated, respectively, with the reflection points on the second map to obtain a corresponding plurality of combined values "$(QCC_n+TL_n)$" associated, respectively, with the reflection points on a third map, the third map representing still another such time slice map and/or horizon map generated by the method and apparatus of the present invention.

In accordance with these and other aspects of the present invention, when a seismic operation is performed on a selected volume of earth in an earth formation, a multitude of seismic signals are received. Those seismic signals are data reduced, and the data reduced seismic signals are provided as input data to a computer workstation which stores a novel software therein hereinafter called a "quadrature correlation software". The quadrature correlation software is initially stored on a storage medium, such as a CD-Rom. The CD-Rom is inserted into the workstation and the quadrature correlation software is loaded from the CD-Rom into the workstation memory and stored therein prior to being executed by a processor of the workstation. When the quadrature correlation software is executed by the workstation processor, bearing in mind that the data reduced seismic signals are comprised of a plurality of seismic signals, the following functional steps are performed by the processor of the workstation: (a) converting each seismic trace "g" of the data reduced seismic signals into a quadrature trace "h" using a Hilbert Transform thereby producing a plurality of seismic traces "g" and a corresponding plurality of quadrature traces "h", (b) cross-correlating each seismic trace "g" with its corresponding quadrature trace "h" thereby producing a corresponding plurality of cross-correlation functions "$Q(\tau)$", (c) determining a quadrature correlation coefficient "QCC" from each cross correlation function "$Q(\tau)$" and a time lag "TL" from each cross correlation function "$Q(\tau)$" thereby producing a further corresponding plurality of quadrature correlation coefficients "QCC" and a further corresponding plurality of time lags "TL", (d) assigning the further plurality of quadrature correlation coefficients "QCC" to a respective plurality of reflection points on a first map to produce a first time slice map and/or a first horizon map, and (e) assigning the further plurality of time lags "TL" to the respective plurality of reflection points on a second map to produce a second time slice map and/or a second horizon map. The quadrature correlation software can also combine a plurality of normalized quadrature correlation coefficients "$QCC_n$" with a further plurality of normalized time lags "$TL_n$" to produce a further plurality of combined values "$(QCC_n+TL_n)$", the further plurality of combined values "$(QCC_n+TL_n)$" being assigned to the respective plurality of reflection points on a third map to produce a third time slice map and/or a third horizon map.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 4 and 5 illustrate the time slice maps produced by the prior art method disclosed in the Bahorich et al patent of FIGS. 2 and 3;

FIG. 8 illustrates a flowchart of the quadrature correlation software of FIG. 7 of the present invention;

FIGS. 10 and 11 illustrate the generation of a quadrature trace h(t) from the seismic trace g(t) using a Hilbert Transform to produce the quadrature trace;

DETAILED DESCRIPTION OF THE PREFERRED EMBODIMENT

Figure 1:
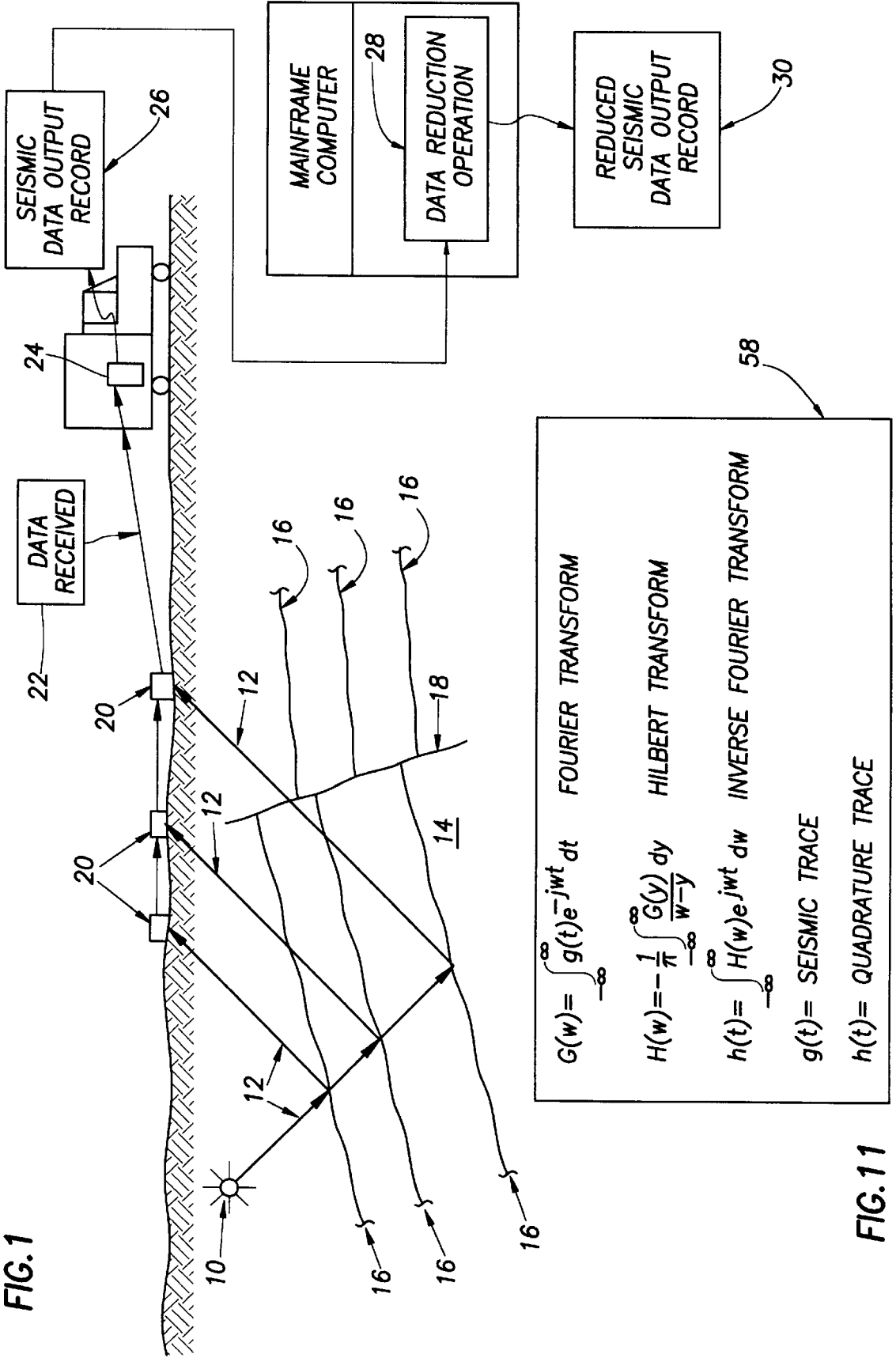
FIG. 1 illustrates a seismic operation being performed on a selected volume of an earth formation thereby producing a seismic data output record which is data reduced thereby further producing a reduced seismic data output record.

Referring to FIG. 1, a typical "seismic survey operation" is illustrated. In FIG. 1, an acoustic source of sound vibrations 10 generates a sound vibration 12 which propagates into an earth formation 14. The sound vibrations 12 reflect off a plurality of horizons 16 in the formation 14. The horizons 16 are separated by a fault 18 in the formation which traverses a section of the earth formation 14. The sound vibrations 12 reflect off the horizons 16 and propagate upwardly to the earth's surface, and a plurality of geophones 20 receive the sound vibrations 12. As a result, electrical signals are generated by each of the geophones 20 representing the sound vibrations 12 which are received by the geophones 20, and those electrical signals contain digital data which will hereinafter be called "data received" 22. The data received 22 is stored in a recording truck computer 24, the data received 22 being subsequently recorded by the recording truck computer on an output record hereinafter called a "seismic data output record" 26. The seismic data output record 26 is subsequently received by a mainframe computer where it undergoes a data reduction operation 28. The data reduction operation 28 is fully discussed in prior pending application Ser. No. 08/796,233 filed Feb. 6, 1997 entitled "method and apparatus for automatically identifying fault cuts in seismic data using a horizon time structure", the disclosure of which is incorporated by reference into this specification. In addition, the data reduction operation 28 is also discussed in a book entitled "Seismic Velocity Analysis and the Convolutional Model" by Enders A Robinson, the disclosure of which is also incorporated by reference into this specification. When the data reduction operation 28 is complete, a reduced seismic data output record 30 is generated by the mainframe computer.

Figure 2:
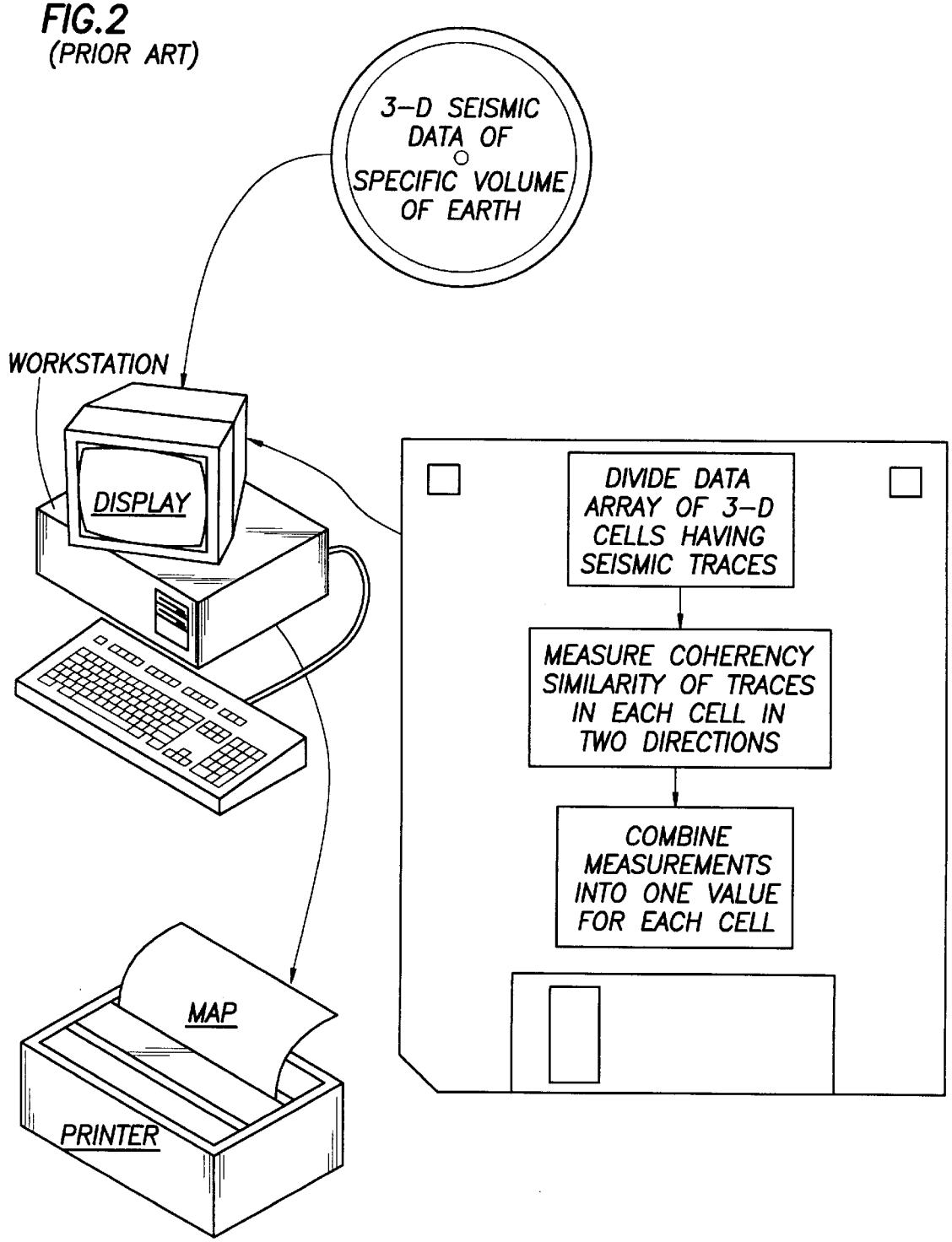
FIGS. 2 and 3 illustrate a prior art method for producing time slice maps in response to received seismic data, this prior art method being disclosed in U.S. Pat. No. 5,563,949 to Bahorich et al, the disclosure of which has already been incorporated by reference into this specification.
Figure 3:
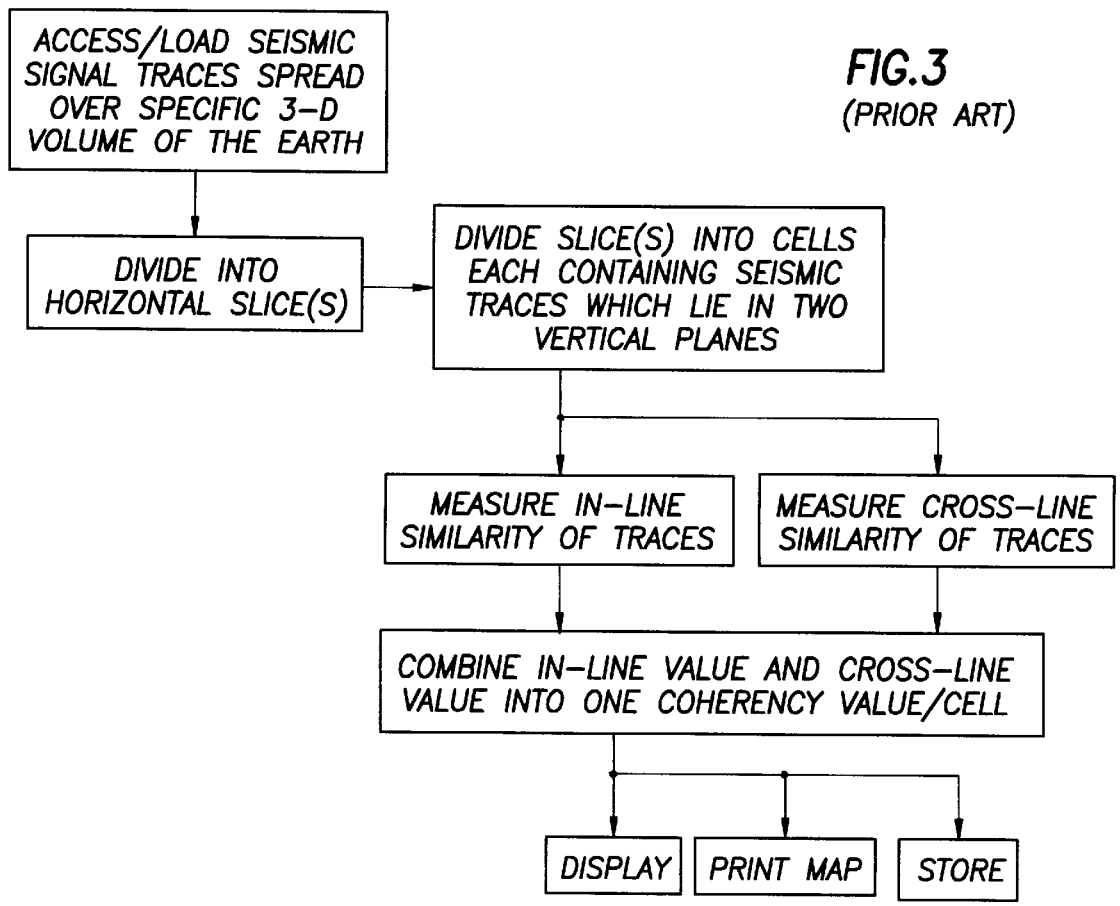

Referring to FIGS. 2 and 3, a method and apparatus for the exploration of hydrocarbons, which is disclosed in prior U.S. Pat. No. 5,563,949 to Bahorich et al, is illustrated. The Bahorich et al patent (U.S. Pat. No. 5,563,949) is incorporated by reference into this specification. The Bahorich et al patent discloses a workstation which stores a software (hereinafter, the "Bahorich software") which, when executed by a processor of the workstation, will generate a time slice map (hereinafter, the "Bahorich time slice map"). FIG. 2 illustrates a diskette which initially stores the Bahorich software. The Bahorich software is subsequently loaded into the workstation as depicted in FIG. 2. FIG. 3 illustrates the Bahorich software in greater detail.

Referring to FIGS. 4 and 5, prior art time slice maps are illustrated. FIG. 5 illustrates the Bahorich time slice map, and FIG. 4 illustrates another time slice map which is prior art relative to the FIG. 5 Bahorich time slice map.

Recall that it is a primary object of the present invention to disclose another such method and associated apparatus for generating time slice maps and/or horizon maps in response to received seismic data, wherein the time slice map and the horizon maps will display various geologic features of a time slice or a horizon in an earth formation. Accordingly, refer now to FIGS. 6 and 7.

Figure 6:
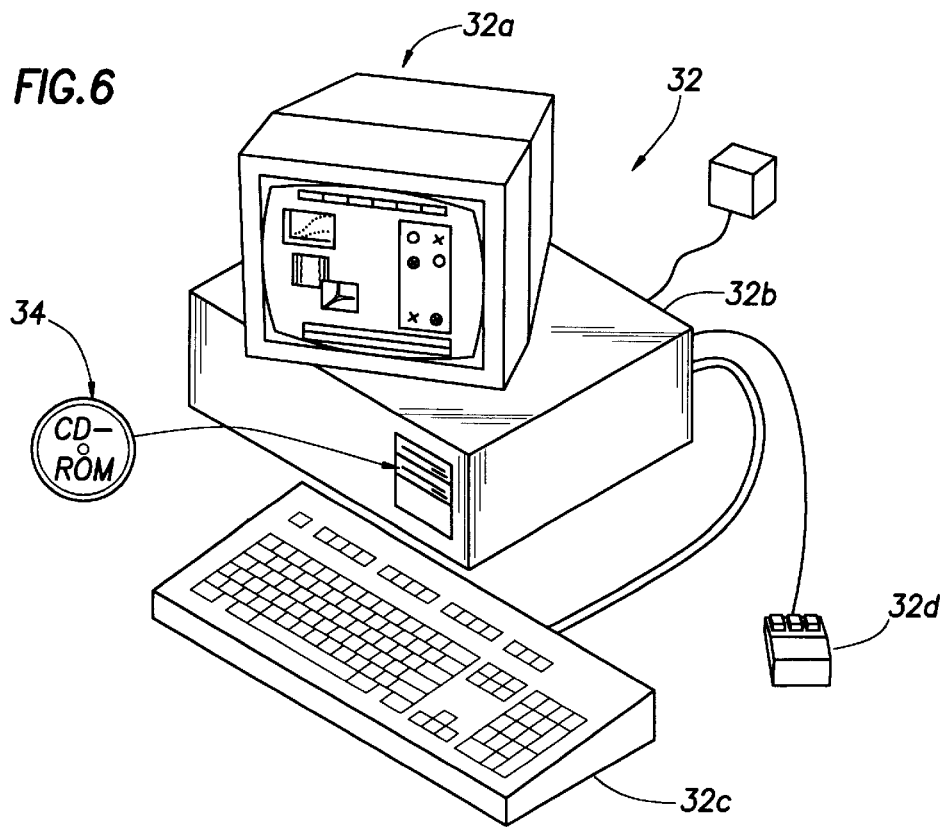
FIGS. 6 and 7 illustrate a workstation which receives a CD-Rom that initially stores the quadrature correlation software of the present invention and which ultimately stores the quadrature correlation software from the CD-Rom in the workstation memory.
Figure 7:
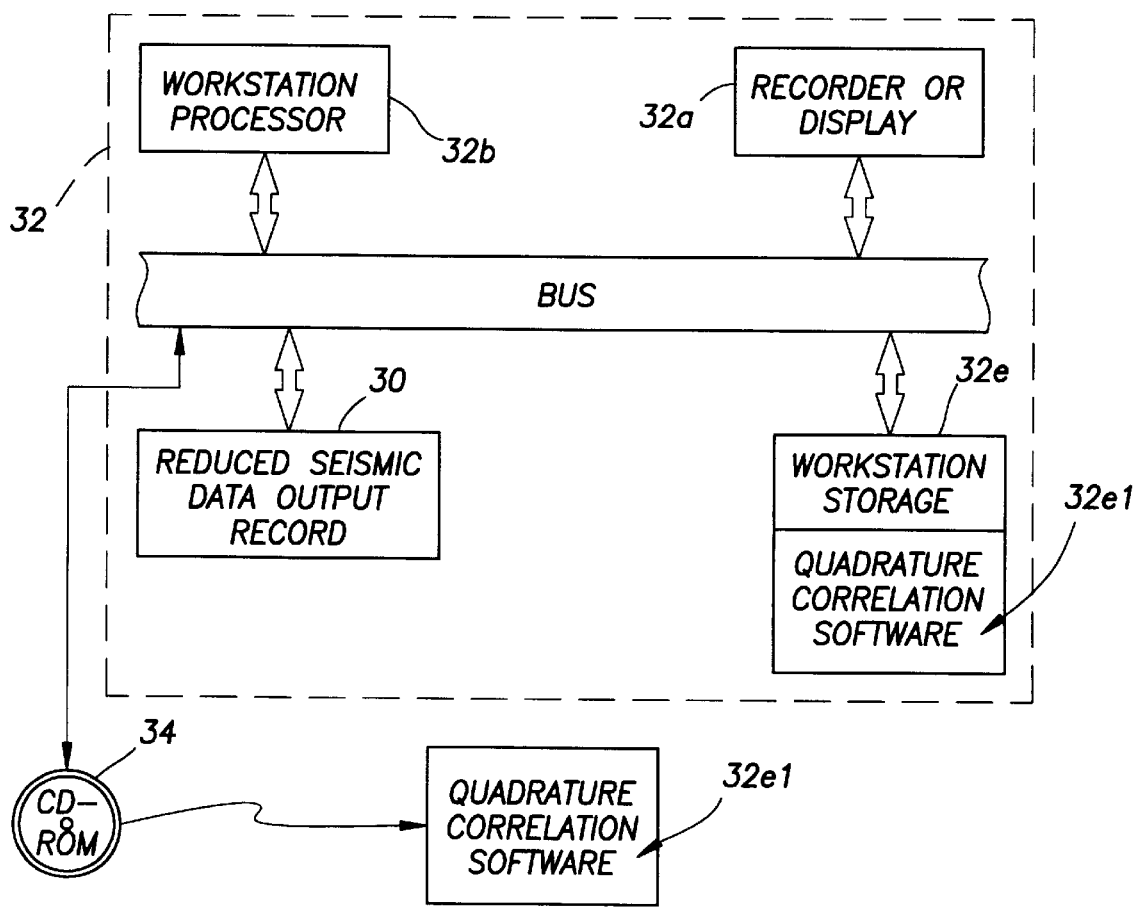

Referring to FIGS. 6 and 7, another workstation adapted for receiving and storing and executing the "quadrature correlation software" of the present invention is illustrated. When executed by the workstation processor, the quadrature correlation software of the present invention will direct the generation of a novel time slice map and/or a novel horizon map which is similar to and is perhaps better than the time slice maps of FIGS. 4 and 5.

In FIG. 6, a workstation 32 includes a monitor 32a, a processor 32b, a keyboard 32c, and a mouse 32d. A storage medium, such as a CD-Rom, 34 stores a software, the CD-Rom 34 being adapted to be inserted into the processor 32b so that the software stored thereon may be loaded into a memory in the workstation processor 32b.

In FIG. 7, the workstation 32 of FIG. 6 is again illustrated. The workstation 32 can receive the CD-Rom 34 which initially stores thereon the quadrature correlation software 32e1 of the present invention. The workstation 32 includes the workstation processor 32b connected to a bus, a recorder or display 32a connected to the bus, and a workstation storage 32e also connected to the bus. When the CD-Rom 34 is inserted into the workstation as depicted in FIG. 6, the quadrature correlation software 32e1, which is initially stored on the CD-Rom 34, is loaded into the workstation 32 and is stored in the workstation storage 32e. As a result, as shown in FIG. 7, the quadrature correlation software 32e1 of the present invention is now stored in the workstation storage 32e and, as a result, the quadrature correlation software 32e1 can now be executed by the workstation processor 32b. The reduced seismic data output record 30 of FIG. 1 is also operatively connected to the bus in FIG. 7. As a result, the seismic data stored on the reduced seismic data output record 30 can be made available to the workstation processor 32b during its execution of the quadrature correlation software 32e1.

The workstation 32 of FIGS. 6 and 7 can comprise a Silicon Graphics Indigo2 workstation. The operating system, which is also stored in the workstation storage 32e, can be written in C programming language under the Unix and Motif standards and the program can be recompiled and run on Sun workstations in conjunction with other IESX products, such as IESX runtime license (part number UAMR1-QD1), IESX data manager (part number UAMR1-QD1), and IESX Seis3DV (part number UA3D1-QD1). The quadrature correlation software 32e1 of the present invention and the above referenced operating system can be obtained from GeoQuest, a division of Schlumberger Technology Corporation, Houston, Tex.

Referring to FIG. 8, a flowchart of the quadrature correlation software 32e1 of FIG. 7 is illustrated. In FIG. 8, the quadrature correlation software 32e1 includes the following steps: (1) determine seismic trace g(t) and quadrature trace h(t) for a reflection point on a time slice or a horizon in a specific volume of earth subject to a seismic operation, block 36 in FIG. 8, (2) cross correlate the seismic trace g(t) and the quadrature trace h(t) to obtain a cross correlation function "Q(τ)", block 38 in FIG. 8, (3) determine the quadrature correlation coefficient "QCC" and the time lag "TL" from the cross correlation function "Q(τ)", block 40 in FIG. 8, (4) assign the quadrature correlation coefficient "QCC" to the reflection point on a first map, block 42 in FIG. 8, (5) assign the time lag "TL" to the reflection point on a second map, block 44 of FIG. 8, (6) answer the question "is the first map and/or the second map complete?", block 46 in FIG. 8, (7) if the answer to the question is "yes", the time slice map and/or the horizon map has been constructed and is ready to be displayed or recorded on the "recorder or display" 32a in FIG. 7; however, if the answer to the question is "no", then, select another reflection point on the time slice or horizon, block 48 in FIG. 8, and return to block 36 and repeat the above referenced steps (1) through (7), blocks 36 through 46 in FIG. 8, until the first map and/or the second map is complete. Each of these steps (1) through (7) will be discussed below with reference to FIGS. 9 through 21.

Determine the Seismic Trace and the Quadrature Trace for a Reflection Point on a Time Slice or a Horizon in a Specific Volume of Earth Subject to a Seismic Operation, Block 36 of FIG. 8

Figures 9, 12:
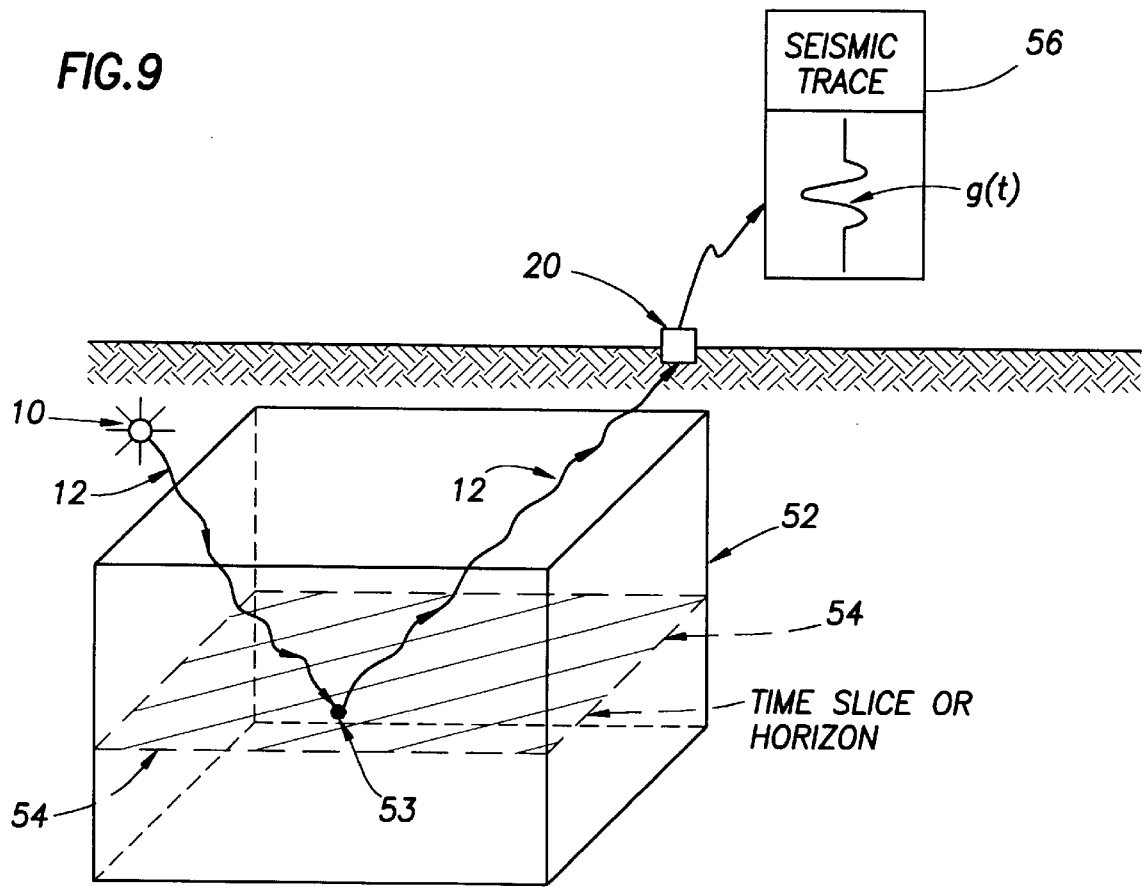
FIG. 9 illustrate the reflection of an acoustic sound vibration off a time slice or a horizon in an earth formation and the creation of a seismic trace g(t) at one of the geophones in FIG. 1.
FIG. 12 illustrates some well known prior art operations whereby the seismic trace g(t) and the quadrature trace h(t) are used in the operations.

In FIG. 9, the acoustic source 10 transmits the sound vibration 12 into a specific volume of earth 52. The sound vibration 12 reflects off a "reflection point" 53 on a plane 54 situated within the specific volume of earth 52 and it is received by one of a plurality of geophones 20 situated at the earth's surface. For purposes of this discussion, the plane 54 can be either a time slice or a horizon. A "time slice" is defined to be a plane (such as plane 54 of FIG. 9) situated within the volume of earth 52 of FIG. 9 wherein all the sound vibrations 12 (which propagate from the acoustic source 10 and reflect off the reflection point 53 on the time slice and are received in the geophone 20) will travel from the source 10 and to the geophones 20 during the same period of reflection time. However, with regard to a "horizon", the sound vibrations 12 will probably travel from the source 10 and to the geophones 20 during different periods of reflection time. Therefore, for purposes of this discussion, plane 54 in FIG. 9 can be either a "time slice" or a "horizon". In FIG. 9, when the sound vibration 12, reflecting off the reflection point 53 on the time slice 54 or the horizon 54, is received in the geophone 20, the geophone 20 will generate a seismic trace 56, the seismic trace 56 being denoted mathematically by the notation "g(t)". Now that the seismic trace g(t) has been defined and constructed, a quadrature trace, denoted by the notation "h(t)", must be derived from the seismic trace g(t).

Figure 10:
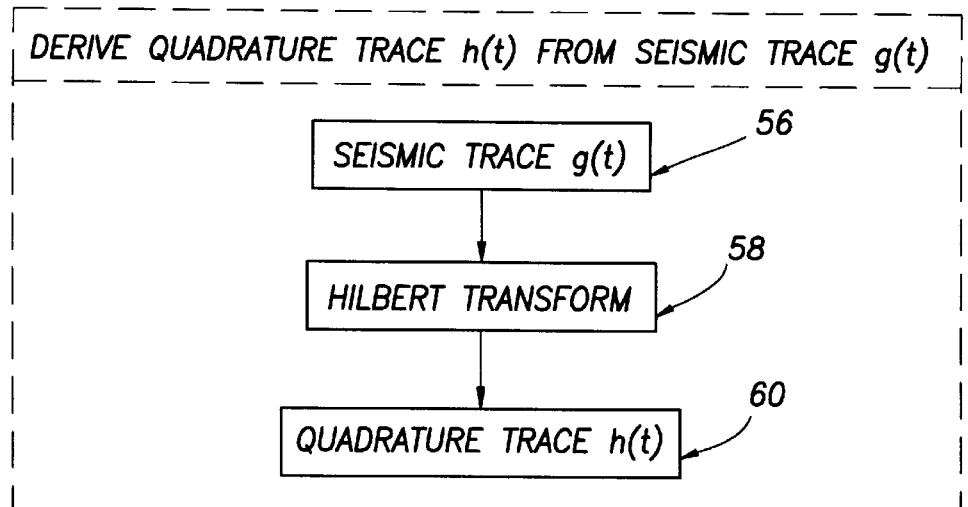

In FIG. 10, the method for deriving the quadrature trace "h(t)" from the seismic trace "g(t)" is illustrated. In FIG. 10, a Hilbert Transform 58, in association with a Fourier Transform and an Inverse Fourier Transform, receives the seismic trace "g(t)" 56 (which was derived in FIG. 9) and, responsive thereto, the Hilbert Transform 58, and associated Fourier Transform and Inverse Fourier Transform, generate the quadrature trace "h(t)" 60.

Referring to FIG. 11, the Hilbert Transform 58, and associated Fourier Transform and Inverse Fourier Transform, are illustrated. As noted in FIG. 11, the quadrature trace "h(t)" 60 can be derived from the seismic trace "g(t)" 56 using the Hilbert Transform 58 in association with the Fourier Transform and Inverse Fourier Transform, as follows:

$$G(\omega) = \int_{-\infty}^{+\infty} g(t) e^{-j\omega t} dt \quad \text{Fourier Transform}$$

$$H(\omega) = -\frac{1}{\pi} \int_{-\infty}^{+\infty} \frac{G(y)}{\omega - y} dy \quad \text{Hilbert Transform}$$

$$h(t) = \int_{-\infty}^{+\infty} H(\omega) e^{j\omega t} d\omega \quad \text{Inverse Fourier Transform}$$

where g(t)=the seismic trace, h(t)=the quadrature trace,

ω=the angular frequency, and y=an integration variable

The Hilbert Transform 58 of FIG. 11 can be found in a book entitled "The Fourier Integral and its Applications", by A. Papoulis, 1962, published by McGraw Hill of New York, N.Y., the disclosure and contents of which is incorporated by reference into this specification.

The quadrature trace h(t) and the seismic trace g(t) are each specifically associated with the reflection point 53 on the time slice 54/horizon 54 of FIG. 9. The seismic trace g(t) and the quadrature trace h(t) have each been derived and constructed and they will be used during the next functional step (block 38 of FIG. 8) during the execution of the quadrature correlation software 32e1 of the present invention illustrated in FIG. 8.

Cross Correlate the Seismic Trace g(t) and the Quadrature Trace h(t) to Obtain a Cross Correlation Function "Q(τ)", Block 38 in FIG. 8

The seismic trace g(t) and the quadrature trace h(t) associated with a specific reflection point 53 on a time slice 54 or a horizon 54 in a specific volume of earth 52 subject to a seismic operation has been determined above with reference to FIGS. 1 through 11.

In FIG. 12, some well known prior art operations involving the seismic trace g(t) and the quadrature trace h(t) are illustrated in FIG. 12. For example, in FIG. 12, "R(t)" represents the reflection strength and "θ(t)" represents the instantaneous phase. The reflection strength and the instantaneous phase in FIG. 12 are each a function of the seismic trace g(t) and the quadrature trace h(t). However, nowhere in the prior art does there exist any disclosure of a cross correlation function "Q(τ)" involving the cross correlation of the seismic trace g(t) and the quadrature trace h(t).

Figures 13, 14:
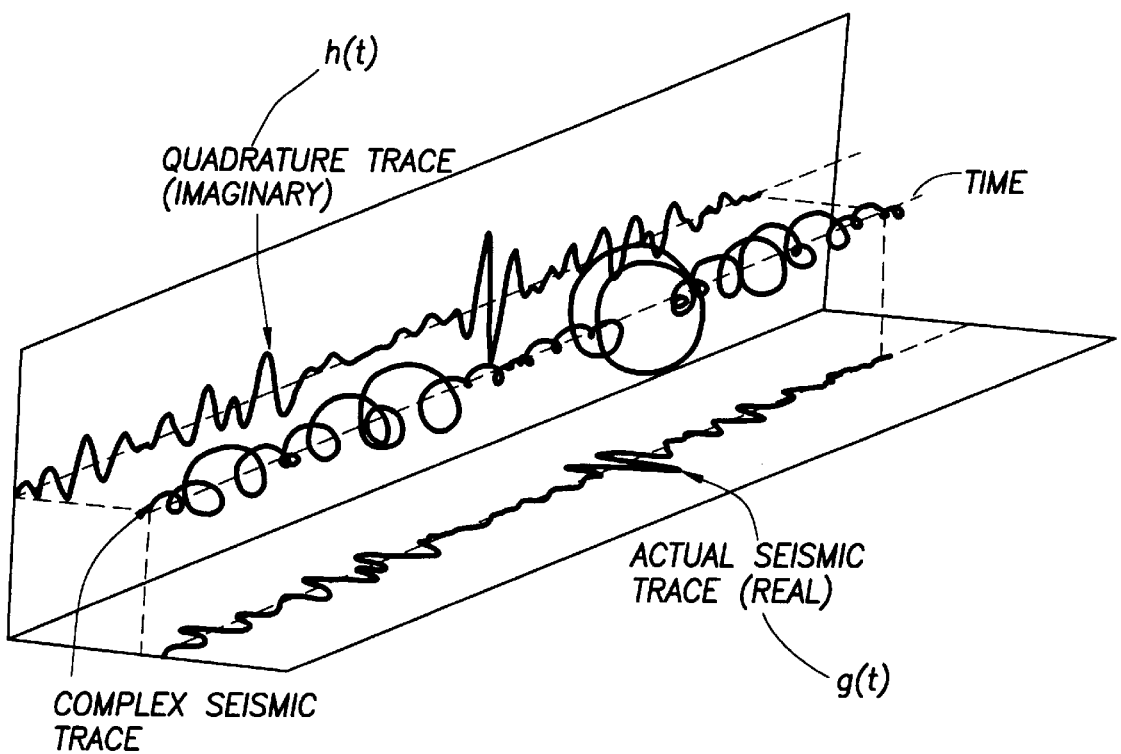
FIG. 13 illustrates the cross correlation of the seismic trace g(t) and the quadrature trace h(t) in accordance with one aspect of the present invention.
FIG. 14 illustrates a typical seismic trace g(t) and a typical corresponding quadrature trace h(t)

In FIG. 13, a cross correlation function "Q(τ)" is illustrated. The cross correlation function "Q(τ)" of FIG. 13 is duplicated below. In accordance with one aspect of the present invention, note that the cross correlation function Q(τ) is a function of both the seismic trace g(t) and the quadrature trace h(t), as follows:

$$Q(\tau) = \frac{\sum_{t=-N}^{N} g(t) h(t+\tau)}{\left[ \sum_{t=-N}^{N} g(t)^2 \sum_{t=-N}^{N} h(t)^2 \right]^{1/2}}$$

As a result, in FIG. 13, in accordance with one aspect of the present invention, the seismic trace g(t) and the quadrature trace h(t) jointly undergo a cross correlation operation, using the cross correlation function illustrated in FIG. 13, and the result of that cross correlation operation is a trace known as the "cross correlation function" trace "Q(τ)". In order to calculate and produce the cross correlation function trace Q(τ), obtain the seismic trace g(t) from FIG. 9 and obtain the quadrature trace h(t) from FIG. 10 using FIG. 11, plug the resultant seismic trace g(t) and the resultant quadrature trace h(t) into the cross correlation function equation shown in FIG. 13, implement the mathematical operation shown in FIG. 13, and the result of that mathematical operation is the cross correlation function trace "Q(τ)".

FIG. 14 illustrates a typical example of a seismic trace g(t) and a quadrature trace h(t) associated with that seismic trace g(t). The example seismic trace g(t) and quadrature trace h(t) in FIG. 14 can be found in a book entitled "Seismic Stratigraphy—Applications to Hydrocarbon Exploration", Memoir 26, published by the American Association of Petroleum Geologists, 1977, the disclosure and contents of which are incorporated by reference into this specification.

Figure 15:
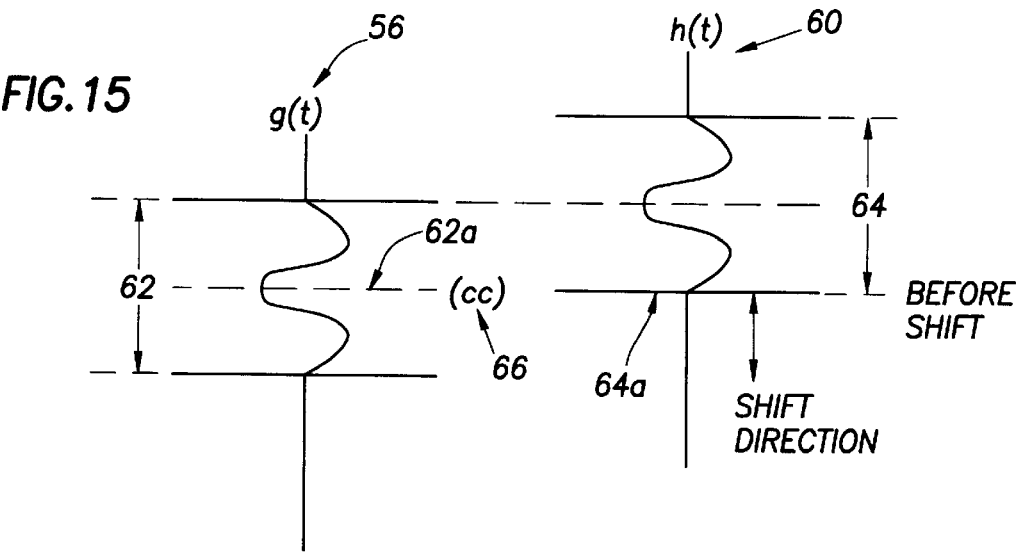
FIGS. 15 and 16 illustrate how the cross correlation of the seismic trace g(t) and the quadrature trace h(t) is accomplished by using a window of a section of g(t) and a window of a section of h(t) and shifting the window of h(t) relative to the window of g(t) during the cross correlation to produce the cross correlation function "$Q(\tau)$"
Figure 16:
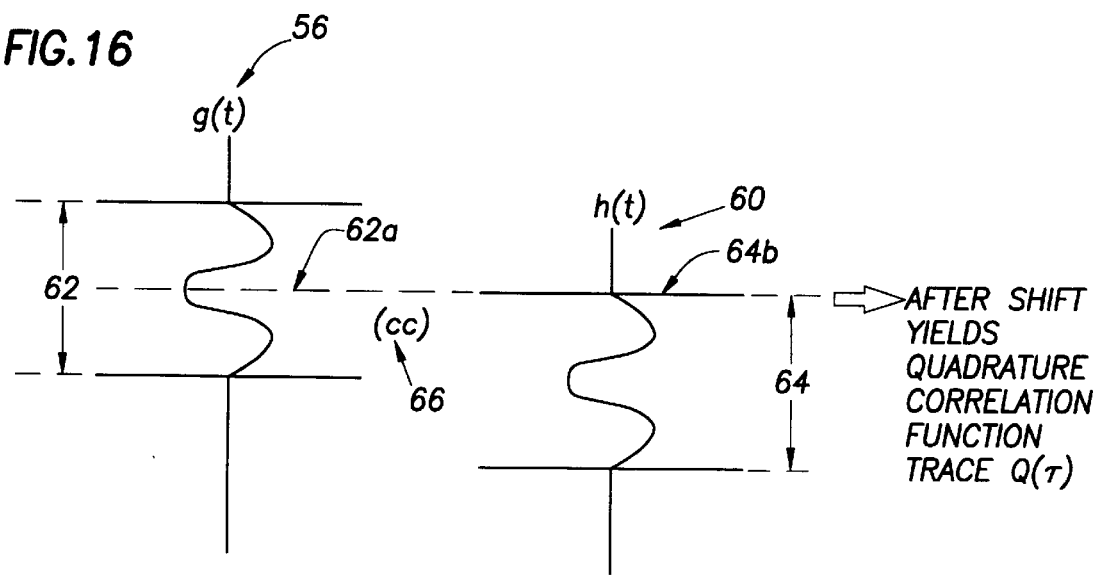

In FIGS. 15 and 16, the cross correlation operation being performed in FIG. 13, wherein the seismic trace g(t) is cross correlated with the quadrature trace h(t) to obtain the cross correlation function trace "Q(τ)", is discussed in greater detail with reference to FIGS. 15 and 16.

In FIG. 15, when the cross correlation operation of FIG. 13 is executed, a portion of the quadrature trace h(t) is shifted relative to a portion of the seismic trace g(t). When that shifting operation is complete, the cross correlation function trace "Q(τ)" is produced. FIGS. 15 and 16 illustrate that shifting operation. In FIG. 15, the seismic trace g(t) 56 is illustrated, but a portion of the seismic trace g(t) 56 is defined by a window 62. In addition, the quadrature trace h(t) 60 is also illustrated, but a portion of the quadrature trace h(t) 60 is also defined by a window 64. The symbol "(cc)" 66 indicates that the cross correlation mathematical operation illustrated in FIG. 13 is about to be performed on the seismic trace g(t) and the quadrature trace h(t). In operation, in FIG. 15, the window 64, enclosing the a portion of the quadrature trace h(t), is shifted downwardly in the "shift direction" indicated in FIG. 15 relative to the window 62 enclosing a portion of the seismic trace g(t) which remains stationary. During the downward shift of the quadrature trace h(t) window 64 relative to the seismic trace g(t) window 62, that portion of the quadrature trace h(t) enveloped by the window 64 is cross correlated with that portion of the seismic trace g(t) enveloped by the window 62, and the cross correlation being performed is the cross correlation mathematical operation illustrated in FIG. 13. Note, in FIG. 15, the specific location of the window 64 relative to the specific location of the window 62, wherein the bottom portion 64a of the window 64 is disposed in substantially direct alignment with the center line 62a of the window 62.

In FIG. 16, when the shifting operation discussed above with reference to FIG. 15 stops, the top portion 64b of the window 64 which envelopes a portion of the quadrature trace h(t) is disposed in substantially direct alignment with the center line 62a of the window 62 and that portion of the quadrature trace h(t) defined by window 64 has been cross correlated with that portion of the seismic trace g(t) defined by window 62 using the mathematical function illustrated in FIG. 13. As a result, in FIG. 16, the cross correlation function trace "$Q(\tau)$" is produced.

Figure 17:
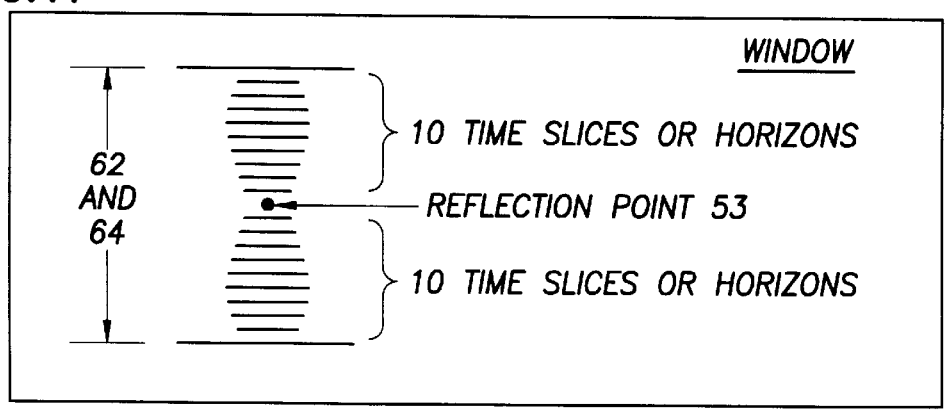
FIG. 17 illustrates a detailed construction of the "window" of the section of g(t) and the "window" of the section of h(t)

In FIG. 17, the width of the window 62 and the window 64 of FIGS. 15 and 16 is illustrated in FIG. 17. In FIG. 17, the window 62 and the window 64 each have a width equal to another window which is centered around the reflection point 53 of FIG. 9 and which has a width corresponding to ten (10) time slices or horizons above the reflection point 53 in FIG. 9 and ten (10) time slices or horizons below the reflection point 53 in FIG. 9.

Determine the Quadrature Correlation Coefficient "QCC" and the Time Lag "TL" From the Cross Crrelation Function "$Q(\tau)$", Block 40 in FIG. 8

Figure 18:
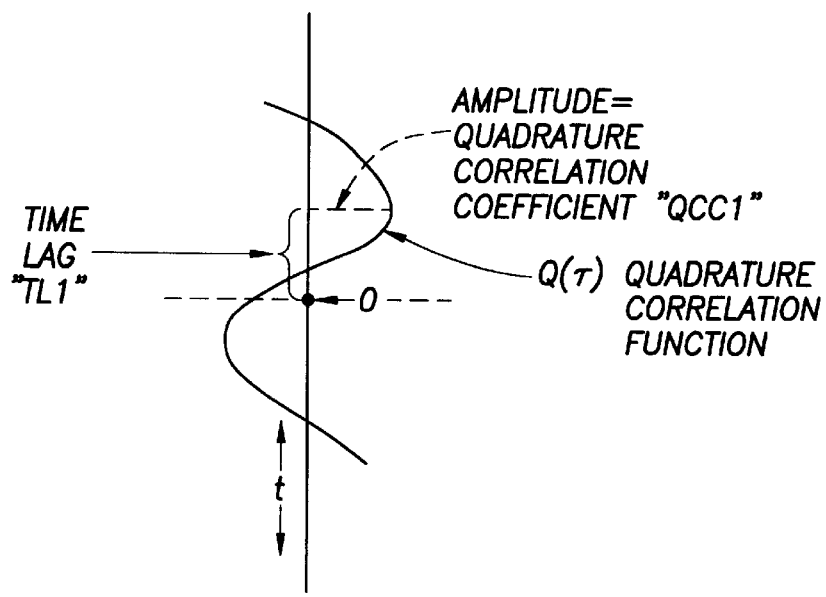
FIG. 18 illustrates the cross correlation function "$Q(\tau)$" and the quadrature correlation coefficient "QCC1" on the cross correlation function "$Q(\tau)$" and the time lag "TL1" on the cross correlation function "$Q(\tau)$"

In FIG. 18, the cross correlation function "$Q(\tau)$" has already been produced in the above discussion with reference to FIG. 16. A simple example of that cross correlation function "$Q(\tau)$" is illustrated in FIG. 18. In FIG. 18, note the location of "zero" on the time axis of the cross correlation function $Q(\tau)$. In FIG. 18, the first peak above "zero" on the $Q(\tau)$ curve is located at a "time lag" or "TL1", and that first peak has an amplitude of "QCC1". The amplitude "QCC1" in FIG. 18 is hereinafter called the "quadrature correlation coefficient". Therefore, in FIG. 18, the cross correlation function trace "$Q(\tau)$" has a "time lag" of "TL1" and a "quadrature correlation coefficient" of "QCC1".

At this point, let us define the term "combined value" to be the sum of the "normalized" time lag and the "normalized" quadrature correlation coefficient. That is, the time lag "TL1" is "normalized", yielding "$(TL1_n)$", and the quadrature correlation coefficient "QCC1" is also "normalized", yielding "$(QCC1_n)$". As a result, the "combined value" associated with the cross correlation function trace "$Q(\tau)$" of FIG. 18 is defined to be the sum of the normalized quadrature correlation coefficient "$(QCC1_n)$" and the normalized time lag "$(TL1_n)$" thereby yielding the combined value "$(QCC1_n)+TL1_n)$". This sum is performed after the quadrature correlation coefficient (QCC) and the time lags (TL) have been normalized to a comparable scale. This is easily done by distributing the original values between 0 and 100 as proportional to the measured minimum and maximum of each set.

As a result, in FIG. 18, three different quantities or values can be derived from the cross correlation function trace "$Q(\tau)$" in FIG. 18 corresponding to reflection point 53 on the time slice or horizon 54 of FIG. 9; and those three different quantities or values can be plotted on a map representative of the time slice or horizon 54 at the precise location of reflection point 53 in FIG. 9. Those three different quantities or values are as follows: (1) the quadrature correlation coefficient "QCC1", (2) the time lag "TL1", and (3) the combined value "$(QCC1_n+TL1_n)$".

Assign the Quadrature Correlation Coefficient "QCC" to the Reflection Point on a First Map, Block 42 in FIG. 8

Figure 19:
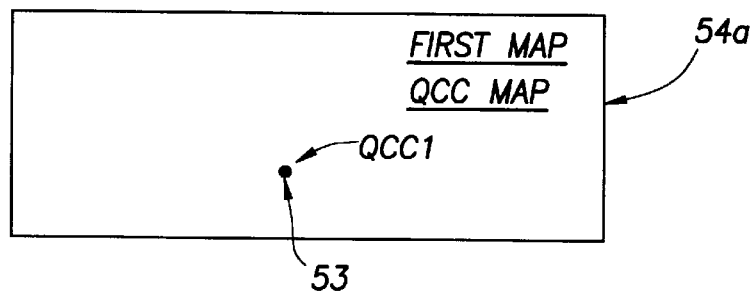
FIG. 19 illustrates a first map of either a time slice or a horizon in the specific volume of earth of FIGS. 1 and 9, the first map depicting the quadrature correlation coefficient "QCC1" of FIG. 18 associated with a particular reflection point on that time slice or horizon.

In FIG. 19, the reflection point 53 of FIG. 9 is located on a map 54a in FIG. 19 which represents the horizon or a time slice 54 of FIG. 9. The quadrature correlation coefficient "QCC1" determined in the above discussion with reference to FIG. 18 is assigned to that reflection point 53 on map 54a of FIG. 19. A color will subsequently be assigned to the reflection point 53 on map 54a of FIG. 19, and that color will represent the quadrature correlation coefficient value "QCC1". All other reflection points on the map 54a in FIG. 19 will undergo the above referenced process for determining other corresponding quadrature correlation coefficient values "QCC" and other colors will be assigned to those other reflection points representing said other quadrature correlation coefficient values "QCC". At that point, a horizon map or time slice map will be complete, that horizon or time slice map illustrating a plurality of quadrature correlation coefficients "QCC" corresponding, respectively, to a plurality of reflection points.

Assign the Time Lag "TL" to the Reflection Point on a Second Map, Block 44 of FIG. 8, Block 44 of FIG. 8

Figure 20:
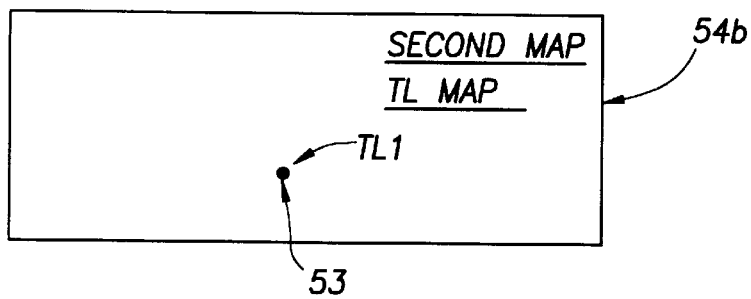
FIG. 20 illustrates a second map of either a time slice or a horizon in the specific volume of earth of FIGS. 1 and 9, the second map depicting the time lag "TL1" of FIG. 18 associated with the aforementioned particular reflection point on that time slice or horizon.

In FIG. 20, the reflection point 53 of FIG. 9 is located on a map 54b in FIG. 20 which represents the horizon or a time slice 54 of FIG. 9. The time lag "TL1" determined in the above discussion with reference to FIG. 18 is assigned to that reflection point 53 on map 54b of FIG. 20. A color will subsequently be assigned to the reflection point 53 on map 54b of FIG. 20, and that color will represent the time lag "TL1". All other reflection points on the map 54b in FIG. 20 will undergo the above referenced process for determining other corresponding time lag values "TL" and other colors will be assigned to those other reflection points representing said other time lag values "TL". At that point, a horizon map or time slice map will be complete, that horizon or time slice map illustrating a plurality of time lags "TL" corresponding, respectively, to a plurality of reflection points.

Figure 21:
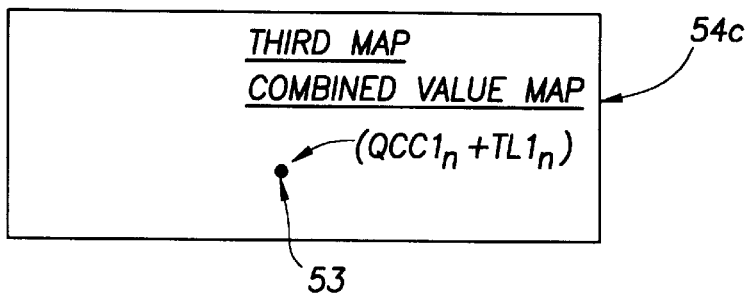
FIG. 21 illustrates a third map of either a time slice or a horizon in the specific volume of earth of FIGS. 1 and 9, the third map depicting the combined value "$(QCC1_n+TL1_n)$" associated with the aforementioned particular reflection point on that time slice or horizon, the "n" indicating a normalized value.

In FIG. 21, the reflection point 53 of FIG. 9 is located on a map 54c in FIG. 21 which represents the horizon or a time slice 54 of FIG. 9. The combined value "$(QCC1_n+TL1_n)$", which represents the sum of the "normalized" value of "QCC1" and the "normalized" value of "TL1" determined above with reference to FIG. 18, is assigned to the reflection point 53 on map 54c of FIG. 21. Another color will subsequently be assigned to the reflection point 53 on map 54c of FIG. 21, and that color will represent the combined value "$(QCC1_n+TL1_n)$". All other reflection points on the map 54c in FIG. 21 will undergo the above referenced process for determining other corresponding combined values "$(QCC1_n+TL1_n)$" and other colors will be assigned to the other reflection points representing said other combined values "$(QCC1_n+TL1_n)$". At that point, a horizon map or time slice map will be complete, that horizon or time slice map illustrating a plurality of the combined values "(QCC1$_n$+TL1$_n$)" corresponding, respectively, to a plurality of the reflection points.

Answer the Question "is the First Map and/or the Second Map Complete!", Block 46 in FIG. 8, and Select Another Reflection Point on the Time Slice or Horizon if the Answer is "No", Block 48 in FIG. 8

When the quadrature correlation coefficient "QCC1" is assigned to reflection point 53 in FIG. 19, and when the time lag "TL1" is assigned to the reflection point 53 in FIG. 20, another new reflection point (adjacent to reflection point 53 in FIG. 9) is selected in FIG. 9, and the above referenced process with reference to FIGS. 8 through 18 is repeated until another new value of quadrature correlation coefficient "QCC" is determined and another new time lag "TL" is determined. The new quadrature correlation coefficient "QCC (new)" is assigned to the new reflection point in FIG. 19, and the new time lag "TL (new)" is assigned to the new reflection point in FIG. 20. This process repeats until a complete quadrature correlation coefficient (QCC) time slice or horizon map is constructed, and/or until a complete time lag (TL) time slice or horizon map is constructed.

After the complete quadrature correlation coefficient (QCC) time slice or horizon map is constructed in FIG. 19, and after the complete time lag (TL) time slice or horizon map is constructed in FIG. 20, a new combined value (QCC$_n$+TL$_n$) time slice or horizon map illustrated in FIG. 21 can be constructed. To construct the new combined value (QCC$_n$+TL$_n$) time slice or horizon map, first "normalize" each quadrature correlation coefficient (QCC) on the quadrature coefficient map of FIG. 19, yielding a plurality of normalized quadrature correlation coefficients QCC$_n$, and then "normalize" each time lag (TL) on the time lag map of FIG. 20, yielding a plurality of normalized time lags TL$_n$. Sum the plurality of normalized quadrature correlation coefficients QCC$_n$, respectively, with the plurality of normalized time lags TL$_n$, thereby yielding a plurality of combined values (QCC$_n$+TL$_n$). Plot the plurality of combined values (QCC$_n$+TL$_n$) on the map of FIG. 21 thereby producing a combined value time slice or horizon map, as illustrated in FIG. 21. For the specific reflection point 53 in FIG. 21, the normalized quadrature correlation coefficient (QCC1$_n$) has been summed with the normalized time lag (TL1$_n$) yielding the combined value (QCC1$_n$+TL1$_n$).

Figure 22:
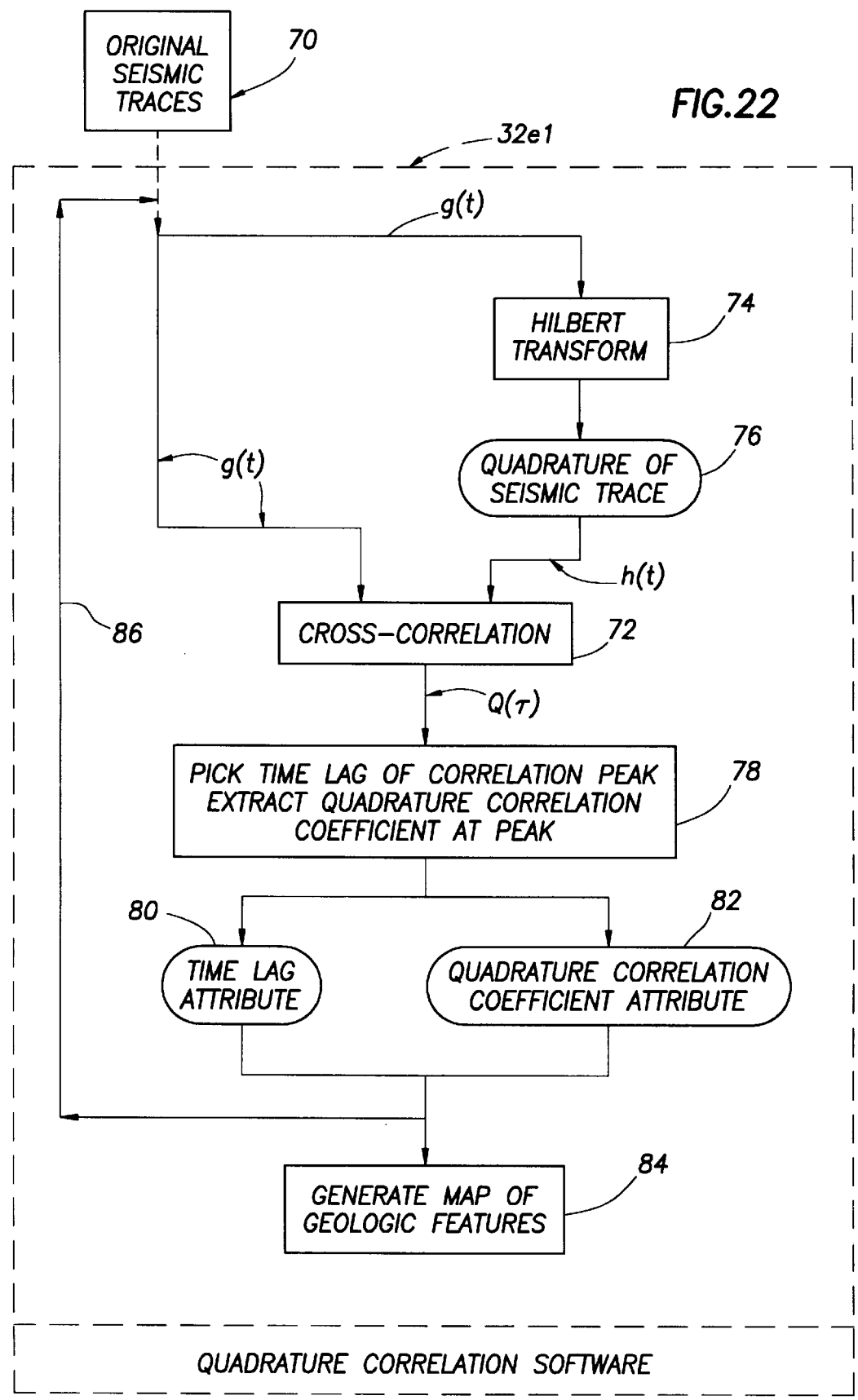
FIG. 22 illustrates another flowchart of the quadrature correlation software of FIG. 7.

Referring to FIG. 22, a summary flowchart of the quadrature correlation software 32*e*1 of FIG. 7, which is initially stored on the CD-Rom 34 and is subsequently loaded into the workstation storage 32*e*, is illustrated.

In FIG. 22, recall, from FIG. 1, that a reduced seismic data output record 30 is generated, and, in FIG. 7, that output record 30 is provided as input data to the workstation 32. In FIG. 9, a multitude of the seismic traces "g(t)" 56 are inherent in the seismic data stored on the output record 30 that is input to the workstation 32. That multitude of seismic traces "g(t)" 56 are represented by block 70 in FIG. 22 and are entitled "original seismic traces" 70. Each of the seismic traces g(t) in the "original seismic traces" 70 in FIG. 22 are input to a cross correlation block 72 and to a Hilbert Transform block 74. The cross correlation block 72 is shown in FIG. 13 and the Hilbert Transform block 74 is shown in FIG. 11. The Hilbert Transform block 74 generates a quadrature trace "h(t)" 76 from the seismic trace g(t), and that quadrature trace h(t) is also input to the cross correlation block 72.

Accordingly, in FIG. 22, in accordance with one aspect of the present invention, the seismic trace g(t) and the quadrature trace h(t) are both provided as inputs to the cross correlation block 72, and, responsive thereto, the cross correlation block 72 (which is shown in FIG. 13) generates a cross correlation function "Q($\tau$)" (see FIGS. 13 and 18).

In FIG. 22, block 78, the time lag "TL1" of the correlation peak is selected (see FIG. 18) and the quadrature correlation coefficient "QCC1" at the correlation peak is extracted (see FIG. 18). As a result, in block 80, the time lag attribute "TL1" is determined; and, in block 82, the quadrature correlation coefficient attribute "QCC1" is also determined (see FIG. 18). In block 84 entitled "generate map of geologic features", a time slice map and/or a horizon map is constructed from the time lag attribute 80; in addition, a time slice map and/or a horizon map is generated from the quadrature correlation coefficient attribute 82 in FIG. 22. In FIG. 22, the feedback loop 86 indicates that another seismic trace (56 in FIG. 9) is selected associated with another reflection point (53 of FIG. 9) on a time slice or horizon (54 of FIG. 9) in an earth formation and the method steps indicated in FIG. 22 are repeated until the entire time slice map or horizon map illustrating the quadrature correlation coefficient "QCC" is constructed, and/or until the entire time slice map or horizon map illustrating the time lag "TL" is constructed.

Figure 23:
FIGS. 23, 24, and 25 illustrate the time slice maps and/or the horizon maps of the present invention which are generated by the workstation of FIG. 7 when the processor of that workstation executes the quadrature correlation software of FIGS. 7 and 8 and 22 in accordance with the present invention, FIG. 23 illustrating an example of the first map (the QCC map) of FIG. 19 also called the "horizon quadrature correlation coefficient" map, FIG. 24 illustrating an example of the second map (the TL map) of FIG. 20 also called the "horizon quadrature correlation time lag" map, and FIG. 25 illustrating an example of the third map (the Combined Value map) of FIG. 21 also called the "QuadCorr—Sum of Correlation Coefficient and Time Lag" map.
Figure 24:
Figure 25:

Referring to FIGS. 23, 24, and 25, typical time slice maps and/or horizon maps, which are generated by the quadrature correlation software 32*e*1 of FIG. 7 in accordance with the present invention, are illustrated.

FIG. 23 illustrates a time slice map and/or horizon map showing the quadrature correlation coefficient "QCC", similar to the map illustrated in FIG. 19 of the drawings.

FIG. 24 illustrates a time slice map and/or horizon map showing the time lag "TL", similar to the map illustrated in FIG. 20 of the drawings.

FIG. 25 illustrates a time slice map and/or a horizon map showing a plurality of the combined values (QCC$_n$+TL$_n$)—representing the sum of the normalized quadrature correlation coefficient and the normalized time lag—which is similar to the map illustrated in FIG. 21 of the drawings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A device adapted for storing instructions which, when executed by a processor of a computer, conducts a process comprising the steps of:
   cross correlating a seismic trace in a set of received seismic data and a quadrature trace of the seismic trace to obtain a cross correlation function "Q($\tau$)", the seismic trace being associated with a reflection point on a time slice or a horizon in an earth formation which is subjected to a seismic operation;
   obtaining a particular value from the cross correlation function "Q($\tau$)"; and
   assigning the particular value to said reflection point on said time slice or said horizon.

2. The device of claim 1, wherein said particular value is selected from a group consisting of: a quadrature correlation coefficient, a time lag, and a sum of a normalized quadrature correlation coefficient and a normalized time lag.

3. The device of claim 1, wherein the cross correlating step comprises the steps of:
   identifying a first window around a portion of said seismic trace;
   identifying a second window around a portion of said quadrature trace;

moving said second window of said quadrature trace relative to said first window of said seismic trace; and cross correlating said seismic trace in said first window and said quadrature trace in said second window to obtain said cross correlation function "Q(τ)".

4. A method of constructing a time slice map or a horizon map corresponding to a time slice or a horizon in an earth formation which is subjected to a seismic operation in response to a set of seismic data, said seismic data including a plurality of seismic traces, each of said seismic traces having a corresponding quadrature trace, comprising the steps of:

(a) cross correlating one of the seismic traces and a corresponding one of the quadrature traces to obtain a cross correlation function "Q(τ)", the seismic trace being associated with a reflection point on the time slice or the horizon in the earth formation;

(b) obtaining a particular value from the cross correlation function "Q(τ)";

(c) assigning the particular value to said reflection point on said time slice or said horizon; and (d) repeating steps (a) through (c) for the remaining one of said plurality of seismic traces and the remaining corresponding ones of said plurality of quadrature traces until all of the particular values have been assigned to all of the reflection points on said time slice or said horizon, said time slice map or said horizon map being constructed when all of the particular values have been assigned to all of the reflection points on said time slice or said horizon.

5. The method of claim 4, wherein the cross correlating step (a) comprises the steps of:

identifying a first window around a portion of said one of the seismic traces;

identifying a second window around a portion of said corresponding one of the quadrature traces;

moving said second window of the quadrature trace relative to said first window of the seismic trace; and cross correlating the seismic trace in said first window and the quadrature trace in said second window to obtain said cross correlation function "Q(τ)".

6. The method of claim 5, wherein said particular value obtained from said cross correlation function is selected from a group consisting of: a quadrature correlation coefficient, a time lag, and a sum of a normalized quadrature correlation coefficient and a normalized time lag.

7. An apparatus adapted for constructing a time slice map or a horizon map corresponding to a time slice or a horizon in an earth formation in response to a set of seismic data, said time slice or horizon having a plurality of reflection points, said seismic data including a plurality of seismic traces corresponding, respectively, to the plurality of reflection points, comprising:

first means for converting said plurality of seismic traces into a corresponding plurality of quadrature traces, each of the seismic traces having a corresponding quadrature trace;

second means for cross correlating said plurality of seismic traces with the respective plurality of quadrature traces to thereby obtain a corresponding plurality of cross correlation functions, each of the seismic traces corresponding to one of the quadrature traces and to one of the cross correlation functions;

third means for determining a plurality of particular values from the plurality of cross correlation functions, at least one particular value corresponding to each of the plurality of cross correlation functions; and fourth means for assigning said plurality of particular values to said plurality of reflection points on a map, each of the plurality of particular values being assigned to a different one of the plurality of reflection points, thereby constructing said time slice map or said horizon map.

8. The apparatus of claim 7, wherein said second means, for cross correlating said plurality of seismic traces with the plurality of quadrature traces to thereby obtain a corresponding plurality of cross correlation functions, comprises the following equation:

$$Q(\tau) = \frac{\sum_{t=-N}^{N} g(t)h(t+\tau)}{\left[\sum_{t=-N}^{N} g(t)^2 \sum_{t=-N}^{N} h(t)^2\right]^{1/2}}$$

where g(t) represents one of said plurality of seismic traces, h(t) and h(t+τ) each represent one of said plurality of quadrature traces, and Q(τ) represents one of said plurality of cross correlation functions.

9. The apparatus of claim 8, wherein said first means, for converting each of said plurality of seismic traces into a quadrature trace, comprises a Hilbert Transform.

10. The apparatus of claim 9, wherein each of said plurality of particular values is selected from a group consisting of: a cross correlation coefficient, a time lag, and a combined value representing a sum of a normalized cross correlation coefficient and a normalized time lag.

* * * * *